US009022455B2

(12) United States Patent
Thiele

(10) Patent No.: US 9,022,455 B2
(45) Date of Patent: May 5, 2015

(54) HINGE GARNISH PANEL FOR VEHICLE SLIDE DOOR

(71) Applicant: Honda Motor Co., Ltd., Tokyo (JP)

(72) Inventor: Steven R. Thiele, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/049,288

(22) Filed: Oct. 9, 2013

(65) Prior Publication Data
US 2015/0097391 A1   Apr. 9, 2015

(51) Int. Cl.
*B60J 5/06* (2006.01)
*B60R 13/02* (2006.01)

(52) U.S. Cl.
CPC ................... *B60R 13/0275* (2013.01)

(58) Field of Classification Search
CPC ................... B60J 5/06; B60J 5/0495
USPC ............ 296/1.08, 146.7, 155, 146.11, 146.12
See application file for complete search history.

(56) References Cited

U.S. PATENT DOCUMENTS

| | | | | |
|---|---|---|---|---|
| 2,993,730 | A * | 7/1961 | Weiertz | 296/146.13 |
| 3,935,674 | A * | 2/1976 | Williams et al. | 49/212 |
| 5,244,247 | A | 9/1993 | Kuwabara | |
| 5,676,417 | A | 10/1997 | Olivier | |
| 6,317,925 | B1 | 11/2001 | Pietryga et al. | |
| 6,447,054 | B1 * | 9/2002 | Pietryga et al. | 296/202 |
| 6,588,151 | B1 | 7/2003 | Goscicki et al. | |
| 7,717,493 | B2 * | 5/2010 | Plavetich | 296/155 |
| 7,986,425 | B2 * | 7/2011 | Nakaota | 358/1.15 |
| 8,033,052 | B2 | 10/2011 | Kraus et al. | |
| 8,141,935 | B2 * | 3/2012 | Thota et al. | 296/155 |
| 8,220,203 | B2 * | 7/2012 | Gase et al. | 49/360 |
| 8,342,593 | B2 | 1/2013 | Ruby, III et al. | |
| 8,596,710 | B2 * | 12/2013 | Naeg et al. | 296/155 |
| 8,713,852 | B2 * | 5/2014 | Choi | 49/360 |
| 8,733,821 | B2 * | 5/2014 | Bisinger et al. | 296/146.7 |
| 2005/0082871 | A1 * | 4/2005 | Anders | 296/155 |
| 2006/0267375 | A1 * | 11/2006 | Enomoto | 296/155 |
| 2009/0189412 | A1 * | 7/2009 | Plavetich | 296/155 |
| 2010/0171336 | A1 * | 7/2010 | Elliott et al. | 296/146.12 |
| 2011/0203180 | A1 * | 8/2011 | Heidrich et al. | 49/305 |
| 2012/0193938 | A1 * | 8/2012 | Krajenke | 296/146.7 |
| 2012/0280532 | A1 | 11/2012 | Bisinger et al. | |
| 2014/0110966 | A1 * | 4/2014 | Kwon et al. | 296/155 |
| 2014/0265430 | A1 * | 9/2014 | Choi et al. | 296/146.7 |

FOREIGN PATENT DOCUMENTS

| | | | | |
|---|---|---|---|---|
| JP | 63-297115 | * | 12/1988 | 296/155 |
| JP | 2009-83669 | * | 4/2009 | B60J 5/06 |

* cited by examiner

*Primary Examiner* — Gregory Blankenship
(74) *Attorney, Agent, or Firm* — Rankin Hill & Clark LLP

(57) ABSTRACT

A vehicle slide door for covering an opening in a vehicle body includes a door trim panel having a slot extending in a longitudinal direction of the vehicle body. A linkage arm operably connects the vehicle door to the vehicle body. The linkage arm slides within the slot of the door trim panel as the vehicle door is moved between a closed position and an opened position. A garnish panel is separate from the door trim panel and is engaged with the linkage arm. The garnish panel at least partially covers a section of the slot of the door trim panel in the closed position of the vehicle door. The garnish panel has a portion movable relative to the door trim panel in a lateral direction of the vehicle body due to an obstruction between the door trim panel and the garnish panel.

20 Claims, 4 Drawing Sheets

HINGE GARNISH PANEL FOR VEHICLE SLIDE DOOR

BACKGROUND

Vehicle sliding doors generally require sliding mechanisms mounted to the door that facilitate opening and closing of the door relative to the vehicle body. The sliding mechanism will often include guide tracks and at least one linkage or hinge arm that connects the vehicle door to the vehicle body. To properly function, there typically are open areas in the door trim panel which allow the linkage arm to freely slide through the trim opening when opening or closing the door. These open areas may be unsightly and considered unacceptable for craftsmanship and appearance. Further, with the linkage arm, a portion of the door trim panel can include a separate garnish that folds in and is attached to the linkage arm as the sliding mechanism closes the slide door. This separate garnish must fit tightly to the rest of the door trim in the door closed position for good fit and finish on the interior of the vehicle. During closing, however, these tight clearance areas can be engaged by the user.

BRIEF DESCRIPTION

In accordance with one aspect, a vehicle slide door for covering an opening in a vehicle body comprises a door trim panel having a slot extending in a longitudinal direction of the vehicle body. A linkage arm operably connects the vehicle door to the vehicle body. The linkage arm slides within the slot of the door trim panel as the vehicle door is moved between a closed position and an opened position. A garnish panel is separate from the door trim panel and is engaged with the linkage arm. The garnish panel at least partially covers a section of the slot of the door trim panel in the closed position of the vehicle door. The garnish panel has a portion movable relative to the door trim panel in a lateral direction of the vehicle body due to an obstruction between the door trim panel and the garnish panel.

In accordance with another aspect, a vehicle slide door for covering an opening in a vehicle body comprises a door trim panel having a slot extending in a longitudinal direction of the vehicle body. A linkage arm operably connects the vehicle door to the vehicle body. The linkage arm slides within the slot of the door trim panel as the vehicle door is moved between a closed position and an opened position. A garnish panel separate from the door trim panel is engaged with the linkage arm. The garnish panel at least partially covers a section of the slot of the door trim panel in the closed position of the vehicle door. The garnish panel includes a rigid body having a first portion and a second portion spaced from the first portion. A biasing member is engaged to the second portion and biases the second portion toward the door trim panel. The second portion is movable relative to the door trim panel in a lateral direction of the vehicle body due to an obstruction between the door trim panel and the garnish panel.

In accordance with yet another aspect, a method for covering an opening in a door trim panel of a vehicle slide door is provided. The method comprises providing a door trim panel having at least one slot, a linkage arm operably associated with the slide door and a vehicle body, and a garnish panel associated with the linkage arm. The garnish panel has a rigid body including a first portion and a separate second portion. The method further comprises covering at least a portion of the slot with the garnish panel; biasing the second portion of the garnish panel rigid body toward the trim panel; and pivoting the second portion of the garnish panel rigid body away from the trim panel in a later direction of the vehicle body due to an obstruction between the door trim panel and the garnish panel.

DETAILED DESCRIPTION

It should, of course, be understood that the description and drawings herein are merely illustrative and that various modifications and changes can be made in the structures disclosed without departing from the present disclosure. In general, the figures of the exemplary hinge garnish panel for a slide door mechanism are not to scale. It will also be appreciated that the various identified components of the exemplary hinge garnish panel disclosed herein are merely terms of art that may vary from one manufacturer to another and should not be deemed to limit the present disclosure.

As used herein, lateral directions are transverse across the vehicle, i.e., left and right directions. Likewise, longitudinal directions refer to forward and rearward directions of vehicle travel, and the vertical directions relate to elevation, i.e., upward and downward directions.

Figure 1:
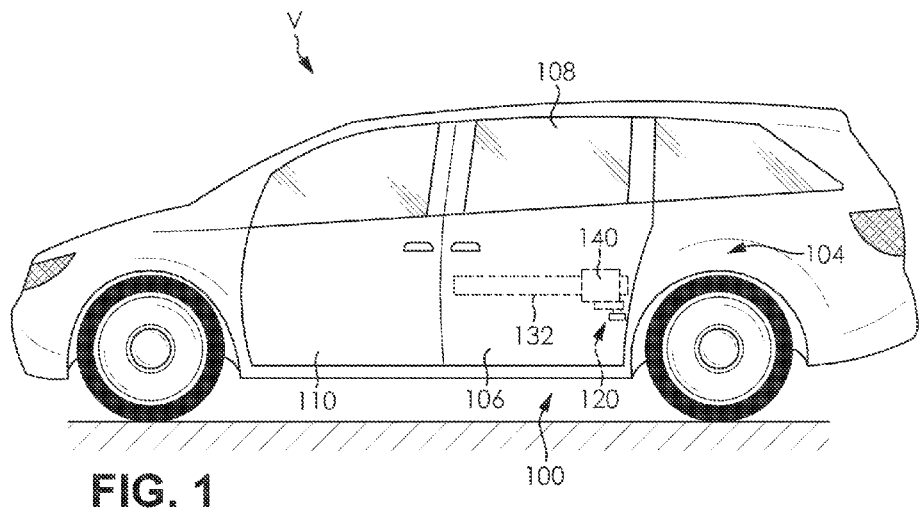
FIG. 1 is a side schematic view of a vehicle having a slide door supported on a vehicle body.
Figure 2:
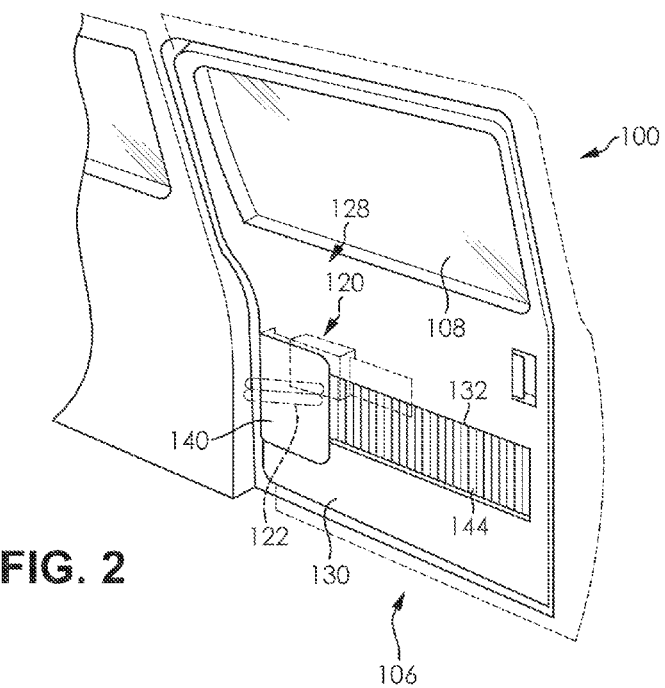
FIG. 2 is a perspective view of the slide door in a closed position.
Figure 3:
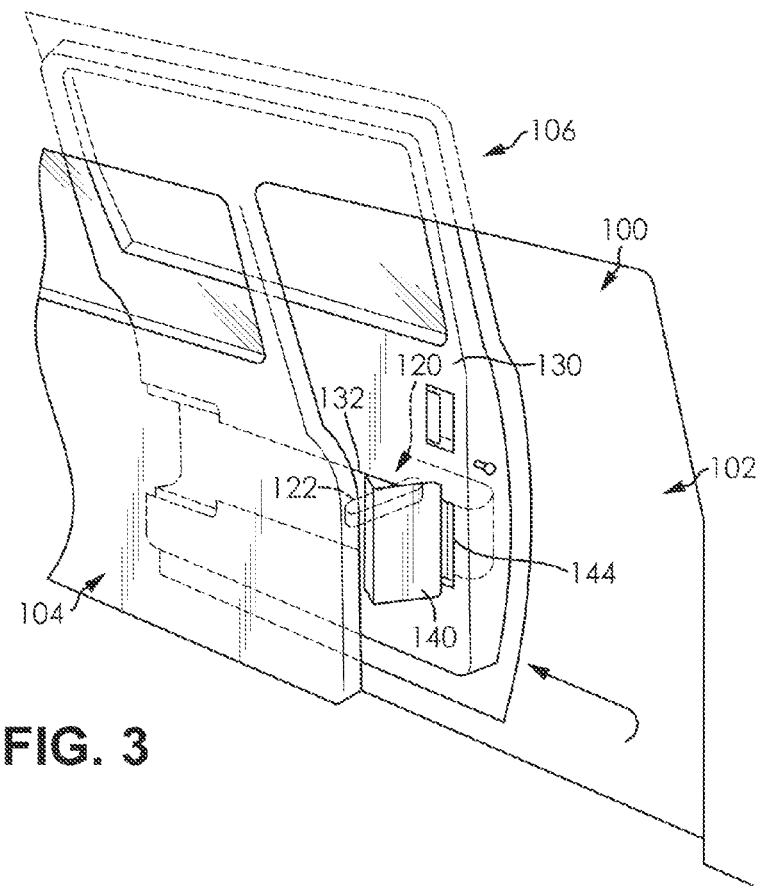
FIG. 3 is a perspective view of the slide door in an opened position.

Referring now to the drawings, wherein like numerals refer to like parts throughout the several views, FIGS. 1-3 illustrate a vehicle V comprising a vehicle slide door assembly 100 for covering an opening 102 in a vehicle side body structure 104 of a vehicle body. The slide door assembly 100 comprises a slide door 106 supported on the vehicle side body structure 104. The slide door 106 is movable in a longitudinal direction of the vehicle V between an open position where the slide door is moved along a lateral side of the side body structure 104 toward a rearward direction of the vehicle and a closed position where the slide door 106 is moved from the open position in a forward direction of the vehicle to close against a frame of the side body structure 104. The slide door 106 can include a window glass or window pane 108 which can be movable in a vehicle vertical direction by operation of a window regulator mechanism (not shown). A front door 110 (left front in FIG. 1) is arranged on a front side of the slide door 106 in the vehicle longitudinal direction.

A sliding door mechanism 120 can be operatively connected to a drive mechanism (not shown) for opening and closing the slide door 106. The sliding door mechanism 120 is arranged to move or displace the slide door 106 from the closed position and to slide the slide door 106 to an open position. According to one aspect of the sliding door mechanism 120, a linkage arm 122 operably connects the slide door 106 to the side body structure 104 of the vehicle body. Upper and lower guide rails (not shown) can be fixed to the side body structure 104 so as to extend in a front-to-rear direction of the side body structure to assist in the movement of the slide door 106 between the closed position and open position. It should also be appreciated that the slide door 106 can also be manually moved between the closed position and open position.

A cover assembly 128 is provided on an interior part of the slide door 106. As best depicted in FIGS. 2 and 3, the cover assembly 128 includes a door trim panel 130 which is secured to a door frame (not shown) in a known manner. The door trim panel 130 has a slot 132 extending in a longitudinal direction of the vehicle body. It should be appreciated that the linkage arm 122 slides within the slot 132 thereby allowing the linkage arm 122 to pass through the door trim panel 130 as the slide door 106 is moved between the closed position and the open position. Further provided with the cover assembly 128 is an exemplary garnish panel 140. As illustrated in FIGS. 2 and 3, the garnish panel 140 is separate from the door trim panel 130 and is engaged with the linkage arm 122. The garnish panel 140 at least partially covers an end section of the slot 132 in the closed portion of the slide door 106. As will be described in greater detail below, the garnish panel 140 is provided with a portion 142 movable relative to the door trim panel 140 in a lateral direction of the side body structure 104 due to an obstruction between the door trim panel 130 and the garnish panel 140 (see FIGS. 7 and 8). Also included with the cover assembly 128 is a tambour door panel 144 associated with the linkage arm 122. The tambour door panel 144 slidably travels within the slot 132, wherein a sliding motion of the slide door 106 imparts movement on the linkage arm 122, the linkage arm 122 sliding within the slot 132, and where the linkage arm 122 simultaneously imparts movement of garnish panel 140 and the tambour door panel 144.

Figure 4:
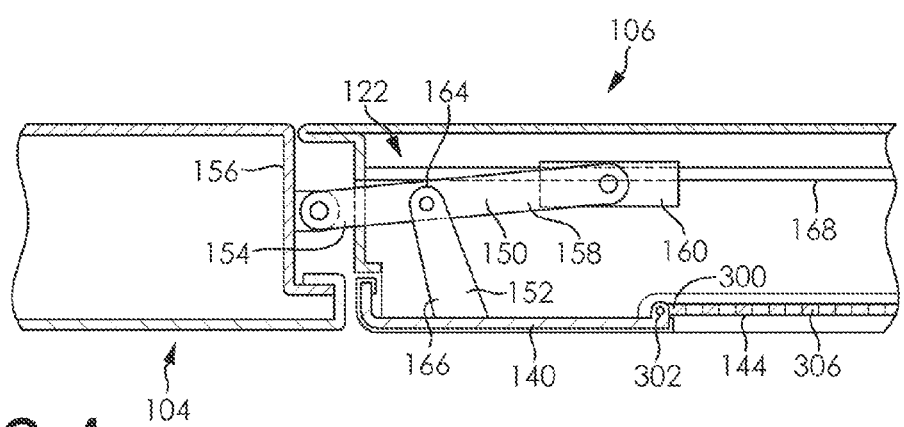
FIG. 4 is a cross-sectional view of the slide door of FIG. 2 showing an exemplary hinge garnish structure provided on a door trim panel.
Figure 5:
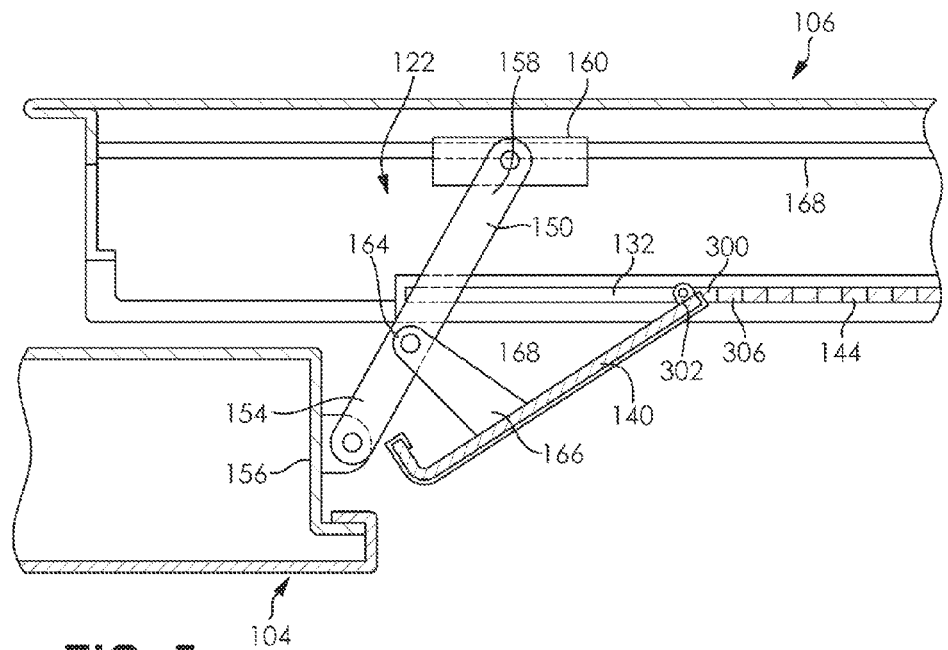
FIG. 5 is a cross-sectional view of the slide door of FIG. 3 showing the exemplary hinge garnish structure in a canted position relative to the door trim panel.

With reference to FIGS. 4 and 5, the linkage arm 122 connects the slide door 106 and the side body structure 104 and facilitates the sliding movement of the slide door 106 relative to the side body structure 104 as the slide door moves between the closed position and open position. To this end, and according to one aspect, the linkage arm 122 can include a first link member 150 and a second link member 152. The first link member has a first end portion 154 pivotally connected to a portion 156 side body structure 104 and a second end portion 158 pivotally connected to a slider 160. The second link member 152 has a first end portion 164 pivotally connected to the first link member 150 and a second end portion 166 fixedly attached to the garnish panel 140. The slider 160 can be slidably mounted on an elongated support bar or track 168, which can be part of the door frame. During opening of the slide door 106, the linkage arm 122 moves the slide door 106 in a lateral direction outwardly from the side body structure 104. This movement of the linkage arm 122 causes the garnish panel 140 to pivot away from the door trim panel 130. As the slide door 106 moves to the opened position, the linkage arm 122 slides along the track 168 and moves through the slot 132 of the door trim panel member 130. It should be appreciated that the linkage arm 122 can be part of a plurality of linkage arms that facilitate sliding of the slide door 106 relative to the side body structure 104 of the vehicle body, such as, for example, a four-bar linkage connecting one of an upper part and a lower part of the slide door 106 to the vehicle body.

Figure 6:
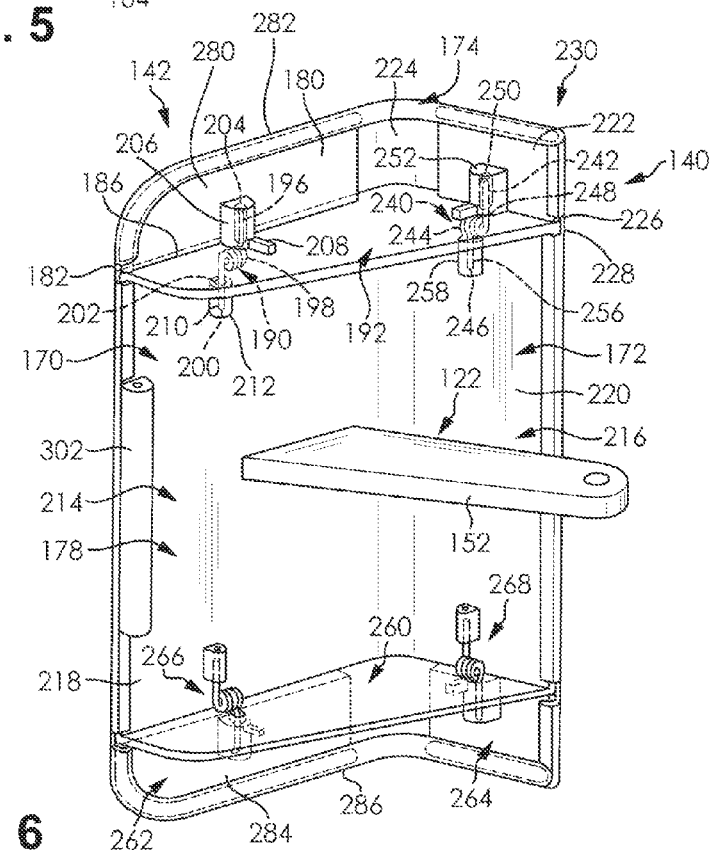
FIG. 6 is a rear perspective view of the exemplary hinge garnish structure.

FIG. 6 depicts the exemplary garnish panel 140. As shown, the garnish panel 140 includes a panel body 170 that can be defined by a rigid body 172 and a flexible body 174 covering the rigid body 172. The material of the flexible body 174 may be a cloth, leather, or any other suitable material. An outer surface of the flexible body 174 has an aesthetic appearance similar to that of the door trim panel 130. As indicated previously, the garnish panel 140 includes the movable portion 142. In the depicted embodiment, the movable portion 142 is defined by the features of the rigid body 172 and flexible body 174. Particularly, the rigid body 172 can have a first portion 178 and a separate second portion 180 spaced from and movable relative to the first portion 178. The flexible body 174 covers the separate first and second portions 178, 180 of the rigid body. A section 182 of the flexible body 174 provided in a space between the first and second portions 178, 180 defines a hinge 186 for the movable portion 142 of the garnish panel 140. According to one aspect, the flexible body 174 is overmolded onto the rigid body 172, and this provides for an integral hinge for the garnish panel 140.

To allow for the movement of the portion 142 of the garnish panel 140, a biasing member 190 is mounted to the garnish panel 140 and biases the movable portion 142 of the garnish panel 140 toward the door trim panel 130. As depicted, to mount the biasing member 190 to the garnish panel 140 a shelf 192 is mounted to an inner surface 194 thereof adjacent the movable portion 142, and can be provided near the hinge 186 on the first portion 178 of the rigid body 172. The shelf 192 at least partially covers the linkage arm 122 and biasing member 190 thereby preventing access to such components when slide door 106 is in the opened position and the garnish panel 140 is canted relative to the door trim panel 130.

Figure 7:
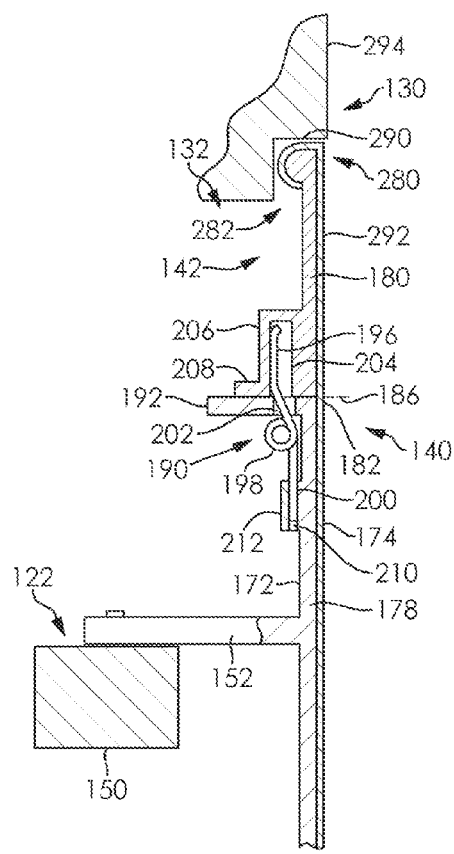
FIG. 7 is a cross-sectional view of a portion of the slide door of FIG. 2.
Figure 8:
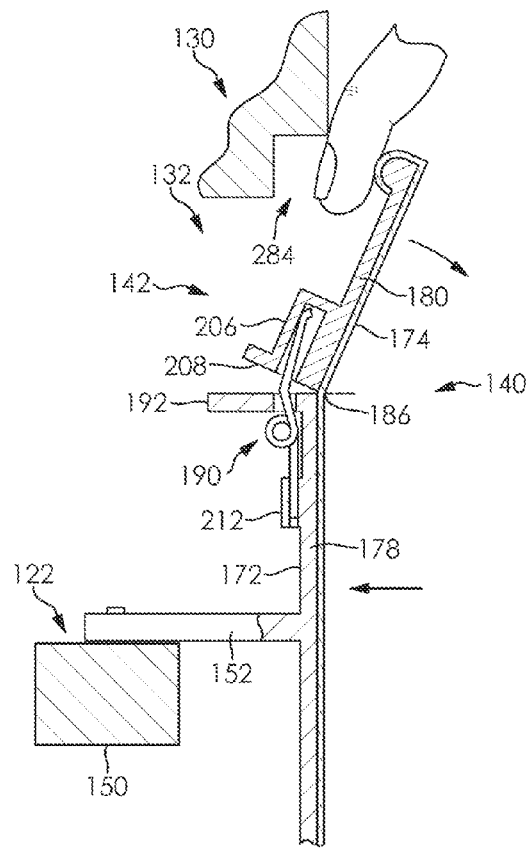
FIG. 8 is a cross-sectional view of a portion of the slide door of FIG. 3 showing movement of the exemplary hinge garnish structure due to an obstruction between the garnish structure and the door trim panel.

In the illustrated embodiment, the biasing member 190 is a helical torsion spring having a first elongated end portion 196 extending from one end of a coiled portion 198 and a second elongated end portion 200 extending from the other end of the coiled portion. As best depicted in FIGS. 7 and 8, the first end portion 196 extends through an aperture 202 in the shelf 192 and can be received in a bore 204 provided in a boss 206 mounted to an inner surface of the second portion 180. This engages the biasing member 190 to the movable portion 142 of the garnish panel 140 and ensures that the movable portion is biased toward the door trim panel 130, but also allows the movable portion 142 to move away from the door trim panel 130 due to an obstruction between the door trim panel 130 and the garnish panel 140 A stop 208 can be located on the boss 206 for engaging the shelf 192 and limiting the movement of the movable portion 142 toward the door trim panel 130. Similarly, the second end portion 200 can be received in a bore 210 of a boss 212 mounted to the inner surface of the first portion 178. However, alternative manners for securing the first elongated portion 196 to the movable portion 142 and the second elongated portion 198 to the panel body 170 are contemplated. It should also be appreciated that instead of the biasing member 190, the material of the flexible body 174 can be impregnated with an elastomeric material which allows the flexible body to at least partially stretch as the second portion 180 moves relative to the first portion 178 due to an obstruction between the door trim panel 130 and the garnish panel 140, and upon removal of the obstruction the flexible body 174 returns to its original condition thereby moving the second portion 180 back toward the door trim panel 130.

With continued reference to FIG. 6, according to one aspect of the present disclosure, the garnish member 140 can be generally L-shaped including a first panel member 214 and a second panel member 216, and each of the first and second panel members can include a movable portion. Particularly, the first panel member 214 includes a first part 218 of the first portion 178 of the rigid body 172 and the second portion 180 of the rigid body 172. The second portion 180 defines the movable portion 142. The linkage arm 122 is attached to the first part 218. The second panel member 216 includes a second part 220 of the first portion 178 of the rigid body 172 and a separate third portion 222 of the rigid body 178. The first and second parts 218, 220 of the rigid body 172 are integrally formed, and the second and third portions 180, 222 of the rigid body 172 are separate from the first and second parts 218, 220 of the first portion 178 of the rigid body 172 and are spaced from one another at a corner 224 of the garnish panel 140. Again, the flexible body 174 covers the rigid body 172 and solely defines a portion of the corner 224 between the second and third portions 180, 222. Further, a section 226 of the flexible body 174 provided in a space between the first and third portions 178, 222 define another hinge 228 for the garnish panel 140. This allows the third portion 222 to move relative to the first portion 178. As such, the third portion 222 of the rigid body 178 defines another movable portion 230 of the garnish panel 140.

With the depicted L-shaped construction of the garnish panel 140, the biasing member 190 is engaged with the movable portion 142 of the first panel member 214. A second biasing member 240 is engaged with the movable portion 230 of the second panel member 216 and biases the movable portion 230 of the garnish panel 140 toward the door trim panel 130. Similar to the biasing member 190, the second biasing member 240 can be a helical torsion spring having a first elongated end portion 242 extending from one end of a coiled portion 244 and a second elongated end portion 246 extending from the other end of the coiled portion. The first end portion 242 extends through an aperture 248 in the shelf 192 and can be received in a bore 250 provided in a boss 252 mounted to an inner surface of the third portion 222. This engages the second biasing member 240 to the second movable portion 230 of the garnish panel 140 and ensures that the second movable portion 230 is biased toward the door trim panel 130, but also allows the second movable portion 230 to move away from the door trim panel 130 due to an obstruction between the door trim panel 130 and the garnish panel 140. Similarly, the second end portion 246 can be received in a bore 256 of a boss 258 mounted to the inner surface of the second part 220 of the first portion 178 of the rigid body 172. Again, alternative manners for securing the second biasing member 240 to the second movable portion 230 are contemplated.

The exemplary garnish panel 240 can further include a second shelf 260 mounted to the inner surface of the garnish panel 240. The second shelf 260 is spaced from and parallel to the first shelf 192, and the first and second shelves 192, 260 provide strength and rigidity to the rigid body 172 of the garnish panel. The second shelf 260 also restricts access to the linkage arm 122 when the slide door 106 is in the opened position. According to another embodiment of the present disclosure, the garnish panel 140 can include a third movable portion 262 and a fourth movable portion 264. The third movable portion 262 is constructed similar to the movable portion 142 and can be biased toward the door trim panel 130 by a third biasing member 266. The fourth movable portion 264 is constructed similar to the second movable portion 230 and can be biased toward the door trim panel 130 by a fourth biasing member 268. The third and fourth biasing members 266, 268 allow the respective third and fourth movable portions 262, 264 to move away from the door trim panel 130 due to an obstruction between the door trim panel 130 and the garnish panel 140.

With reference back to FIGS. 6 and 7, a first edge portion 280 of the garnish panel 140 can include a flange 282 at least partially defined by the flexible body 174. The flange 282 can extend about periphery of the movable portions 142, 230. Similarly, a second end portion 284 of the garnish panel 140 can include a flange 286 at least partially defined by the flexible body 174. The flange 286 can extend about periphery of the movable portions 262, 264. The door trim panel 130 includes a recess 290 located adjacent an upper edge of the slot 132 for receiving the flange 282. A similar recess (not shown) can be located adjacent a lower edge of the slot 132 for receiving the flange 286. As depicted, in the closed position of the slide door 106, the flange 282 is positioned in the recess 284 and the flange 286 is positioned in the other recess. This allows an exterior surface 292 of the flexible body 174 to be flush with an exterior surface 294 of the door trim panel 130.

As indicated previously, the tambour door panel 144 is associated with the linkage arm 122. As best depicted in FIGS. 4 and 5, an end portion 300 of the tambour door panel 144 is connected to the garnish panel 140. According to one aspect, the garnish panel 140 can include a hub 302 to which the end portion 300 can be connected thereto. This allows the garnish panel 140 to pivot relative to the tambour door panel 144 and allows the tambour door panel 144 to move with the garnish panel 140 between an extended position (FIG. 2) by closing the slide door 106 and a retracted position (FIG. 3) by opening the slide door. The tambour door panel 144 may be made of a plurality of slats 306 that are interconnected to one another in a known manner. The tambour door panel 144 may be manufactured out of any material that results in the tambour door panel being stiff enough to provide a rigid cover when in the extended position, thereby preventing access to interior regions of the slide door 106, yet flexible enough to deflect and curve as the slide door 106 is moved between the closed position and open position. The flexible material of the tambour door panel 144 may be a cloth, plastic, leather, or any other suitable material. The tambour door panel 144 is extended to the remaining portion of the slot 132 of the door trim panel 130 upon closing of the slide door 106. As the slide door 106 is opened, the tambour door panel 144 retracts and translates within the slide door to allow the linkage arm 122 to pass through the slot 132.

As is evident from the foregoing, the present disclosure is directed to a spring-loaded, hinge garnish panel 140 near the rear interior of the slide door 106. The garnish panel 140 is biased to close against a mating shape on the door trim panel 130. The garnish panel 140 would reduce pinch forces should an obstruction get in between the garnish panel 140 and door trim panel 130 during closing of the slide door 106. A biasing member or spring 190 forces a hinged portion 142 of the garnish panel 140 to return to its initial position which allows the finish to be consistent with the door trim panel 130.

The present disclosure further provides a method for covering an opening in a trim panel 130 of a slide door 106. The method comprises providing a door trim panel 130 having a slot 132, a linkage arm 122 operably associated with a slide door 106 and a vehicle body 104, and a garnish panel 140 associated with the linkage arm 122. The garnish panel 140 has a rigid body 172 including a first portion 178 and a separate second portion 180. The method comprises covering at least a portion of the slot 132 with the garnish panel 140; biasing the second portion 180 of the garnish panel rigid body 172 toward the door trim panel 130; and pivoting the second portion 180 of the garnish panel rigid body 172 away from the door trim panel 130 in a lateral direction of the vehicle body 104 due to an obstruction between the door trim panel 130 and the garnish panel 140. The method further includes overmolding a flexile body 174 onto an outer surface of the garnish panel rigid body 172, a portion of the flexible body 174 spanning between the separate first and second portions 178, 180 of the rigid body 172 defining a hinge 186 for pivoting movement of the second portion 180.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle slide door for covering an opening in a vehicle body comprising:
   a door trim panel having a slot extending in a longitudinal direction of the vehicle body;
   a linkage arm operably connecting the vehicle door to the vehicle body, the linkage arm sliding within the slot of the door trim panel as the vehicle door is moved between a closed position and an opened position; and
   a garnish panel separate from the door trim panel and engaged with the linkage arm, the garnish panel at least partially covering a section of the slot of the door trim panel in the closed position of the vehicle door, the garnish panel including a portion movable relative to the door trim panel in a lateral direction of the vehicle body due to an obstruction between the door trim panel and the garnish panel.

2. The vehicle slide door of claim 1, further including a biasing member mounted to the garnish panel and engaging the movable portion, the biasing member biasing the movable portion of the garnish panel toward the door trim panel.

3. The vehicle slide door of claim 2, wherein the garnish member is generally L-shaped and includes a first panel member and a second panel member, each of the first and second panel members including a movable portion.

4. The vehicle slide door of claim 3, wherein the biasing member is engaged with the movable portion of the first panel member and further including a second biasing member engaged with the movable portion of the second panel member.

5. The vehicle slide door of claim 2, wherein the garnish panel includes a shelf mounted to an inner surface thereof adjacent the movable portion, the shelf at least partially covering the linkage arm and biasing member.

6. The vehicle slide door of claim 5, wherein the shelf is a first shelf and further including a second shelf mounted to the inner surface of the garnish panel, the second shelf spaced from and parallel to the first shelf.

7. The vehicle slide door of claim 5, wherein the biasing member is a helical torsion spring having an elongated end portion extending through an aperture in the shelf and engaging the movable portion of the garnish panel.

8. The vehicle slide door of claim 1, wherein the garnish panel includes a rigid body having a first portion and a second portion spaced from and movable relative to the first portion, and a flexible body covering the first and second portions of the rigid body, a section of the flexible body provided in a space between the first and second portions defining a hinge for the movable portion of the garnish panel.

9. The vehicle slide door of claim 8, wherein the flexible body is overmolded onto the rigid body to define an integral hinge for the garnish panel.

10. The vehicle slide door of claim 8, wherein an edge portion of the garnish panel includes a flange defined by the flexible body, and the door trim panel includes a recess for receiving the flange, wherein in the closed position of the vehicle door, the flange is positioned in the recess and an exterior surface of the flexible body is flush with an exterior surface of the door trim panel.

11. The vehicle slide door of claim 1, further including a tambour door panel received in the slot of the door trim panel, an end portion of the tambour door panel connected to the garnish panel, the tambour door panel movable with the garnish panel between an extended position by closing the sliding vehicle door and a retracted position by opening the sliding vehicle door.

12. A vehicle slide door for covering an opening in a vehicle body comprising:
    a door trim panel having a slot extending in a longitudinal direction of the vehicle body;
    a linkage arm operably connecting the vehicle door to the vehicle body, the linkage arm sliding within the slot of the door trim panel as the vehicle door is moved between a closed position and an opened position; and
    a garnish panel separate from the door trim panel and engaged with the linkage arm, the garnish panel at least partially covering a section of the slot of the door trim panel in the closed position of the vehicle door, the garnish panel including a rigid body having a first portion and a second portion spaced from the first portion, and a biasing member engaged to the second portion and biasing the second portion toward the door trim panel, the second portion movable relative to the door trim panel in a lateral direction of the vehicle body due to an obstruction between the door trim panel and the garnish panel.

13. The vehicle slide door of claim 12, wherein the garnish panel includes a flexible body covering the first and second portions of the rigid body, a section of the flexible body provided between the first and second portions defining a hinge.

14. The vehicle slide door of claim 13, wherein an edge portion of the flexible body defines a flange of the garnish panel, and the door trim panel includes a recess for receiving the flange, wherein in the closed position of the vehicle door, the flange is positioned in the recess and an exterior surface of the flexible body is flush with an exterior surface of the door trim panel.

15. The vehicle slide door of claim 12, further including a movable tambour door panel received in the slot of the door trim panel, an end portion of the tambour door panel connected to the first portion of the garnish panel.

16. The vehicle slide door of claim 12, wherein the garnish panel includes a shelf mounted to an inner surface of the first portion adjacent the second portion, and the biasing member is a helical torsion spring having an elongated end portion extending through an aperture in the shelf and engaging the second portion of the rigid body.

17. The vehicle slide door of claim 16, wherein the shelf is a first shelf and further including a second shelf mounted to the inner surface of the first portion, the second shelf spaced from and parallel to the first shelf, the first and second shelves providing strength and rigidity to the garnish panel.

18. The vehicle slide door of claim 12, the garnish panel is generally L-shaped and includes a first panel member and a second panel member, each of the first and second panel members including a rigid body having a first portion and a movable second portion, and wherein the biasing member is engaged with the movable second portion of the first panel member and further including a second biasing member engaged with the movable second portion of the second panel member.

19. A method for covering an opening in a door trim panel of a vehicle slide door comprising:
- providing the door trim panel having a slot, a linkage arm operably associated with the slide door and a vehicle body, and a garnish panel associated with the linkage arm, the garnish panel having a rigid body including a first portion and a separate second portion;
- covering at least a portion of the slot with the garnish panel;
- biasing the second portion of the garnish panel rigid body toward the door trim panel; and
- pivoting the second portion of the garnish panel rigid body away from the door trim panel in a lateral direction of the vehicle body due to an obstruction between the door trim panel and the garnish panel.

20. The method of claim 19, further including overmolding a flexible body onto an outer surface of the garnish panel rigid body, a portion of the flexible body spanning between the separate first and second portions of the rigid body defining a hinge for pivoting movement of the second portion.

\* \* \* \* \*